E. J. RANDALL.
AUTOMATIC RELEASE COUPLING.
APPLICATION FILED JUNE 21, 1921.

1,409,776. Patented Mar. 14, 1922.

Ernest J. Randall.
INVENTOR

BY Victor J. Evans
ATTORNEY

UNITED STATES PATENT OFFICE.

ERNEST J. RANDALL, OF UTICA, MINNESOTA.

AUTOMATIC RELEASE COUPLING.

1,409,776. Specification of Letters Patent. Patented Mar. 14, 1922.

Application filed June 21, 1921. Serial No. 479,347.

*To all whom it may concern:*

Be it known that I, ERNEST J. RANDALL, a citizen of the United States, residing at Utica, in the county of Winona and State of Minnesota, have invented new and useful Improvements in Automatic Release Couplings, of which the following is a specification.

The object of my present invention is the provision of a simple, durable and reliable automatic release coupling for use on plows and other power drawn machines, and one which will afford a rigid coupling under normal conditions and will not be liable to double up when the power apparatus is backed.

Other objects and practical advantages of the invention will be fully understood from the foregoing description and claims when the same are read in connection with the drawings, forming part of this specification, in which:—

Similar numerals of reference designate corresponding parts in all of the views of the drawings.

Figure 1:
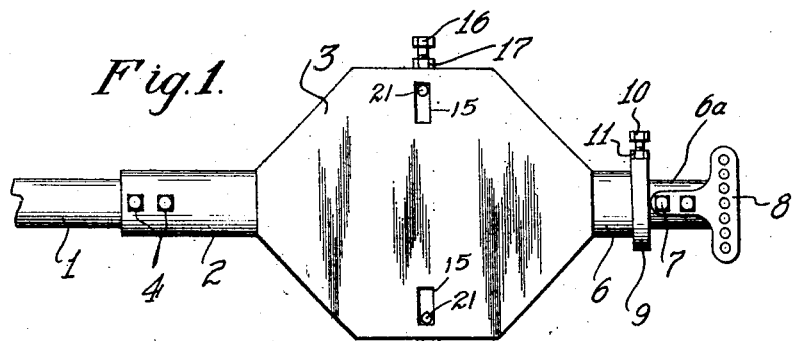
Figure 1 is a side elevation of my novel coupling.

At 1 I illustrate a beam or tongue which may be that of the plow or of any other machine to be drawn. Receiving the forward end of the beam 1 is the rear reduced portion 2 of the casing 3 of my novel coupling; the said reduced portion 2 being connected to the beam or tongue 1 by bolts 4, and the said casing 3 being provided at 5 with peep holes so as to enable the operator to observe the positions of the interior parts of the coupling as hereinafter referred to.

At the forward end of the casing 3 is a reduced portion 6 receiving a draw bar $6^a$ to which is connected by bolts 7 a clevis 8, designed and adapted to be connected to a tractor in the ordinary well known manner. On the said draw bar $6^a$ and back of the clevis is arranged a locking collar 9 equipped with a set screw 10 and a lock nut 11. The draw bar $6^a$ is designed to rest normally with its rear end in the rear reduced portion 2 of the casing 3, and in opposite sides and at an intermediate point in the length of the draw bar $6^a$ are provided notches 12 the forward walls of which are beveled as indicated by 13. The casing 3 is slotted, as indicated by 15, to receive lateral projections 21 on members 20 which are bifurcated as indicated by $15^x$. The members 20 are secured by nuts 22 on threaded bolts 16, and are connected by the said bolts to opposite walls of the casing 3, the bolts being equipped with lock nuts 17 to prevent casual loosening thereof.

Pivoted in the bifurcations $15^x$ of the members 20 are swinging blocks 14 which are connected by interposed expansion springs 19 with dogs 18.

Figure 2:
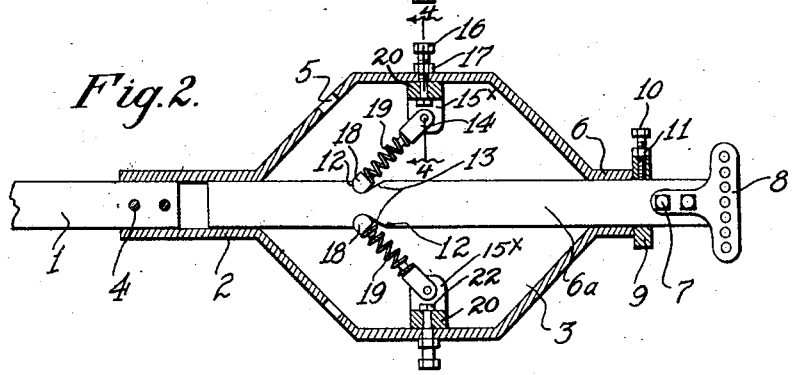
Figure 2 is a longitudinal vertical section of the same with the parts in normal working position.
Figure 3:
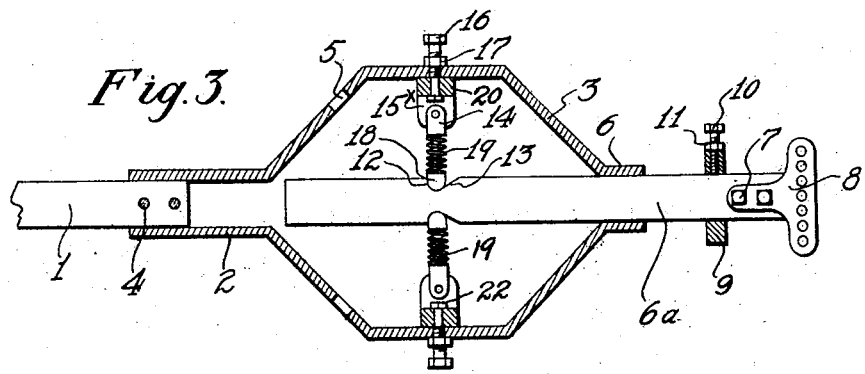
Figure 3 is a view similar to Figure 2, with the parts in the positions they occupy when the plow has encountered an obstruction in its path and the draw bar is on the point of being released.
Figure 4:
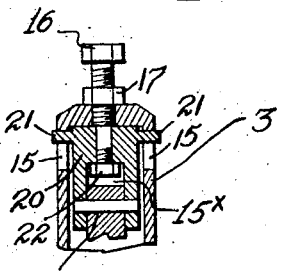
Figure 4 is an enlarged transverse section taken in the plane indicated by the line 4—4 of Figure 2.

Under normal conditions of operation the springs 19 will operate to retain the dogs 18 and consequently the draw bar $6^a$ in the positions shown in Figure 2. When, however, an obstruction is encountered by the plow, the draw bar $6^a$ is adapted to move forwardly against the action of the springs 19 and the dogs 18 and out of the casing 3 with the result that breakage will be averted.

In addition to the automatic release capacity of my novel coupling, it will be observed that the coupling is of a rigid character and is not liable to double up when the power draft means is backed; and it will also be observed that the coupling can be used to advantage on various kinds of plows, and may be expeditiously and easily substituted for the clevis usually marketed with the said plows.

Subsequent to the release and withdrawal of the draw bar $6^a$ from the casing 3 under the condition stated, the draw bar may be expeditiously and easily reengaged with the casing 3; it being simply necessary to loosen the set screw 10 and move the collar 9 forwardly and push the draw bar $6^a$ rearwardly into the casing 3, and then when the dogs 18 are in proper position, to draw the clevis 8 forwardly to a sufficient extent to put the springs 19 under tension. The collar 9 is then positioned as shown in Figure 2, and is secured in such position when the device will be again ready for use.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In an automatic release coupling, the combination of a casing, a draw bar sheathed in the casing and extending therefrom and having notches, threaded bolts extending through opposite walls of the casing and equipped with lock nuts to engage said walls, members arranged in the casing and secured on the bolts and held against turning by the casing, swinging blocks pivotally connected to said members, dogs to engage the notches in the draw bar, and springs interposed between and connecting the swinging blocks and the said dogs.

2. In an automatic release coupling, the combination of a casing, spring backed release dogs therein, and a draw bar sheathed in the casing and extending forwardly therefrom and having notches adapted to seat the said dogs, with a locking collar detachably secured on the draw bar in front of the casing.

In testimony whereof I affix my signature.

ERNEST J. RANDALL.